US008225219B2

(12) United States Patent
Edelen et al.

(10) Patent No.: US 8,225,219 B2
(45) Date of Patent: Jul. 17, 2012

(54) IDENTIFYING UNIQUE CONTENT IN ELECTRONIC MAIL MESSAGES

(75) Inventors: James J. Edelen, Seattle, WA (US); Jorge Pereira, Seattle, WA (US); Gautam Bhakar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 896 days.

(21) Appl. No.: 12/029,902

(22) Filed: Feb. 12, 2008

(65) Prior Publication Data

US 2009/0204903 A1    Aug. 13, 2009

(51) Int. Cl.
G06F 3/00 (2006.01)
G06F 15/16 (2006.01)
(52) U.S. Cl. .................. 715/753; 715/752; 709/206
(58) Field of Classification Search .................. 715/753, 715/752; 709/206
See application file for complete search history.

(56) References Cited

U.S. PATENT DOCUMENTS

| | | | | |
|---|---|---|---|---|
| 5,905,863 | A | 5/1999 | Knowles | 709/206 |
| 6,421,709 | B1 * | 7/2002 | McCormick et al. | 709/206 |
| 6,496,853 | B1 | 12/2002 | Klein | 709/206 |
| 6,704,772 | B1 | 3/2004 | Ahmed | 709/207 |
| 6,745,197 | B2 | 6/2004 | McDonald | 707/102 |
| 6,772,397 | B1 | 8/2004 | Bates | 715/205 |
| 7,062,536 | B2 | 6/2006 | Fellenstein | 709/206 |
| 7,243,125 | B2 | 7/2007 | Newman | 709/206 |
| 2002/0073157 | A1 * | 6/2002 | Newman et al. | 709/206 |
| 2003/0158903 | A1 | 8/2003 | Rohall | 709/206 |
| 2006/0195785 | A1 | 8/2006 | Portnoy | 715/700 |
| 2007/0174394 | A1 * | 7/2007 | Jayaweera | 709/206 |

FOREIGN PATENT DOCUMENTS

EP    1327192 B8    4/2005

OTHER PUBLICATIONS

Learning to Extract Signature and Reply Lines from Email, Vitor R. Carvalho, et al., Jul. 2004, http://www.cs.cmu.edu/~vitor/papers/sigFilePaper_submited.pdf, pp. 1-8.
Exploiting Email Structure to Improve Summarization, Derek Lam et al., 2002, http://domino.watson.ibm.com/cambridge/research.nsf/2b4f81291401771785256976004a8cd13/74c0a77cbfad5ae585256bf80054b036/$FILE/TR2002-02.pdf, pp. 1-8.
Threading Electronic Mail a Preliminary Study, David D. Lewis et al., 1997, http://compstat.chonbuk.ac.kr/Sisyphus/CurrentStudy/TDM/Paper/lewis96e.ps, pp. 1-15.

* cited by examiner

*Primary Examiner* — Tuyetlien Tran
*Assistant Examiner* — Peiyong Weng
(74) *Attorney, Agent, or Firm* — Merchant & Gould

(57) ABSTRACT

Unique content in interrelated email messages is identified and duplicate content filtered out for user friendly display of a flow of exchange within the interrelated messages. Follow-on messages such as replies or forwards are compared to the original message to determine which part of a follow-on message is not present in the original message and is a unique part of the follow-on message. The comparison includes parsing of the messages to extract user viewable parts determination of which extracted part is the last message part containing unique information. Once the unique message part is determined, message body that excludes everything after the unique part including the headers is be displayed.

18 Claims, 9 Drawing Sheets

IDENTIFYING UNIQUE CONTENT IN ELECTRONIC MAIL MESSAGES

BACKGROUND

Exchanged messages are treated in conventional email systems similar to regular mail. Increasingly email is no longer standalone, or simple one way communication. A given email is now often part of a large protracted "conversation", an interrelated series of messages that, when viewed over time and in aggregate, more closely resembles an interactive discussion between people and groups.

Interrelated messages are displayed by various electronic mail applications in different ways (e.g. tree structure, color scheme, use of graphics, etc.). However, many of the messages in the interrelated series include duplicate content from previous replies, forwards, and the like. When reading a series of related messages, the duplicate content tends to distract the reader and make it difficult to follow the flow of the exchange.

Because different electronic mail systems process messages differently and because unique content is not always uniformly inserted into the messages (e.g. inline comments, at the beginning of a reply, at the end of a reply, etc.), the unique content may not be extracted easily. Approaches such as tagging unique content also fail when one electronic mail system does not recognize a tag inserted by another electronic mail system.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to determining unique content in interrelated email messages for user friendly display of a flow of exchange within the interrelated message. Follow-on messages such as replies or forwards are compared to the original message to determine which part of a follow-on message is not present in the original message and is a unique part of the follow-on message. The comparison includes parsing of the messages to extract user viewable parts determination of which extracted part is the last message part containing unique information. Once the unique message part is determined, message body that excludes everything after the unique part including the headers may be displayed.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Figure 1:
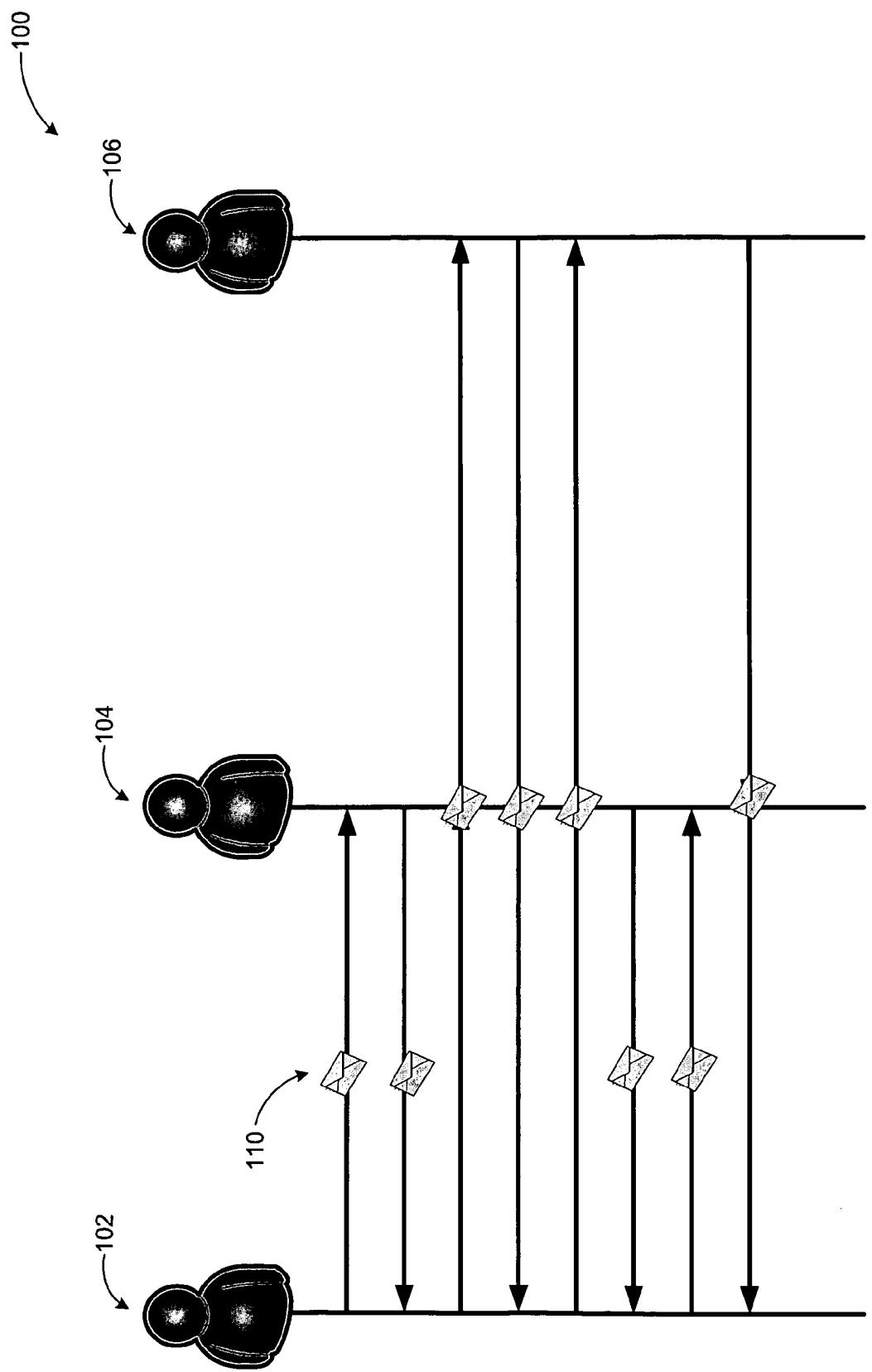
FIG. 1 illustrates a conceptual diagram of exchanged emails in a conversation involving three users.

As briefly described above, unique parts of interrelated emails in an exchange may be determined by comparing user-viewable parts of follow-on messages and original message and other parts of follow-on messages not displayed for providing a user-friendly flow of exchange to the user. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process.

The term 'message' as used herein includes—in addition to regular email message—electronic mail system objects like invitations, meeting notifications, notifications of updates to meeting dates/times, messages that acknowledge receipt of messages or indicate a message has been received and read, messages that indicate a message has been received and discarded before being read, as well as a number of other artifacts that may appear to be part of how a human conversation may be modeled. For example, based on an email conversation one may schedule a meeting. The process of scheduling the meeting may involve multiple iterations of people accepting or rejecting the meeting proposal, as well proposing new times/dates/places. Some users may consider the invitation/ accept/reject objects as "messages"—thereby part of the conversation—whereas other users may not.

Referring to FIG. 1, FIG. 1 a conceptual diagram of exchanged emails in a conversation involving three users is illustrated. Diagram 100 shows users 102, 104, and 106 of an email system exchanging messages. The messages 110 exchanged between users 102, 104, and 106 may include regular text-based messages, image or graphics documents, textual attachments, audio messages, or any other forms of message as discussed above. As shown in the diagram, the messages may be sent by one user to another or multiple others (e.g. user 102 to user 104 or users 104 and 106). Responses to the original message may be received from different parties, which themselves may be sent to all participants or to the originator. Thus, the exchanged messages may have a complicated structure, while all together representing a series of interrelated emails as part of a conversation among the participants (users 102, 104, 106).

As discussed previously, without applying some form of duplicate content filtering reading interrelated messages while following the flow of exchanges can be extremely difficult. Filtering duplicate content based on location of content (e.g. beginning of a message, or end of a message) has the disadvantages of distinguishing between messages from different systems which may insert new content (or "unique" content) to the top or bottom of the old content and distinguishing new content in messages where it has been inserted inline. Employing tags to identify and separate old and new content also runs into problems when one of the users utilizes an email application that does not recognize the tags or when new content is inserted inline (in-between the elements of old content).

A system according to embodiments identifies new or unique content in each message within a multi-message exchange by parsing user-viewable parts of the message body, comparing them, and removing potentially distracting portions such as headers (e.g. subject line), disclaimers, advertising blurbs, and the like.

In order to determine the unique content of each message for displaying in the user interface, the content in a follow-on message is "differenced" with the content of the parent message. What is left over is the unique content. According to one embodiment, the message content is scanned to the latest point of unique content in the follow-on message and the message part, which that content belongs to, found and the whole portion returned such that a partial message part is not displayed to the user to avoid confusion. The exception to this approach is content added at the very end of the message—usually advertising or disclaimers.

The advertising and/or disclaimer may be detected and exposed to the user (once), but not taken into consideration for differencing purposes. An algorithm according to one embodiment breaks up the message into chunks using header detection. Then, the last message part in the message is found and compared to the last message part in the parent message. Since formatting and/or style may be changed by the user or email application without adding new content, only the textual or graphics portion of the messages may be compared between the two. If they match, parsing and comparing process may move on to the next (n−1) message part in the message and in the parent. The process may be repeated until a part is found where the two messages are different and the full message part that contains the point of difference returned (as long as it is not a header). When differencing the very last message part, only the number of words that are found in that message part in the parent message may be differenced such that an advertising or disclaimer blurb can be ignored.

Figure 2:
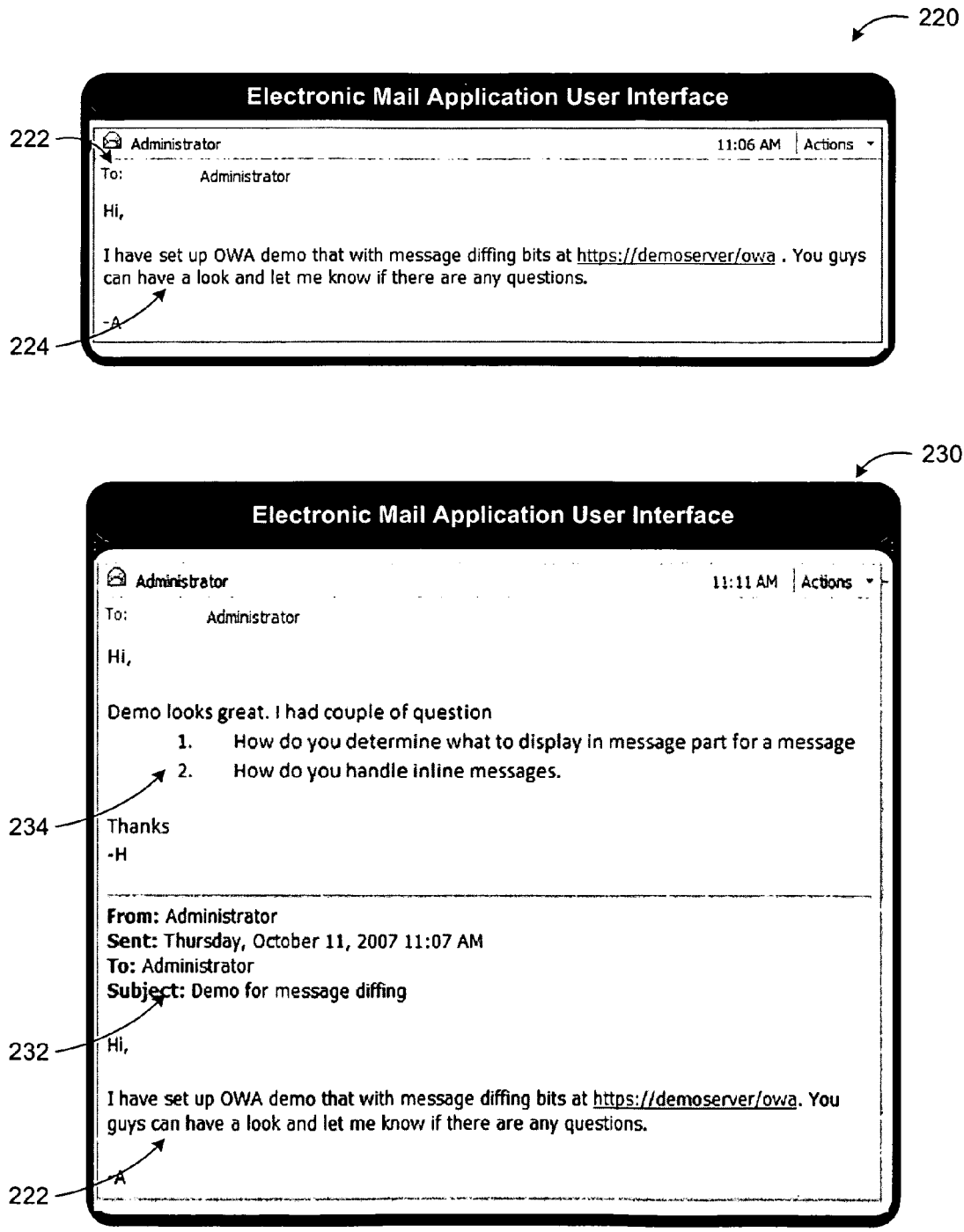
FIG. 2 illustrates two screenshots of an email application user interface showing an example original message and a reply message that includes the original message when unique part determination and filtering is not applied.

FIG. 2 illustrates two screenshots of an email application user interface showing an example original message and a reply message that includes the original message when unique part determination and filtering is not applied. An email application may have many aspects such as scheduling items, complementary user interfaces for presenting attachments (e.g. audio players, video players, image editors, etc.), and so on. Example screenshots 220, 230, and subsequent ones in following figures illustrate basic features of an email application user interface related to displaying messages by filtering out duplicate content.

Screenshot 220 shows a message M1 by a first user. The message has basic parts of a typical email message: header 222 and body 224. While the header may include various pieces of information such as sender, recipient(s), subject, etc., a collapsed version is shown in the figure with only the sender's name. The body 224 may include text, graphics, images, inserted audio-video files, and other data. For simplicity purposes, only a textual message body is illustrated in the figure.

Screenshot 230 illustrates a reply message M2 to the message M1. In this screenshot, message M2 is displayed on top of message M1 with its body 234. The body 222 of the original message M1 is displayed unchanged, while the header of the original message is shown in full form (232) as opposed to the collapsed form shown in screenshot 220. When no duplicate content filtering is applied, the displayed message includes practically two distinct messages (M1 and M2) attached to each other. In this view, the reader trying to follow the flow of exchange from M1 to M2 may be distracted by the header 232.

Figure 3:
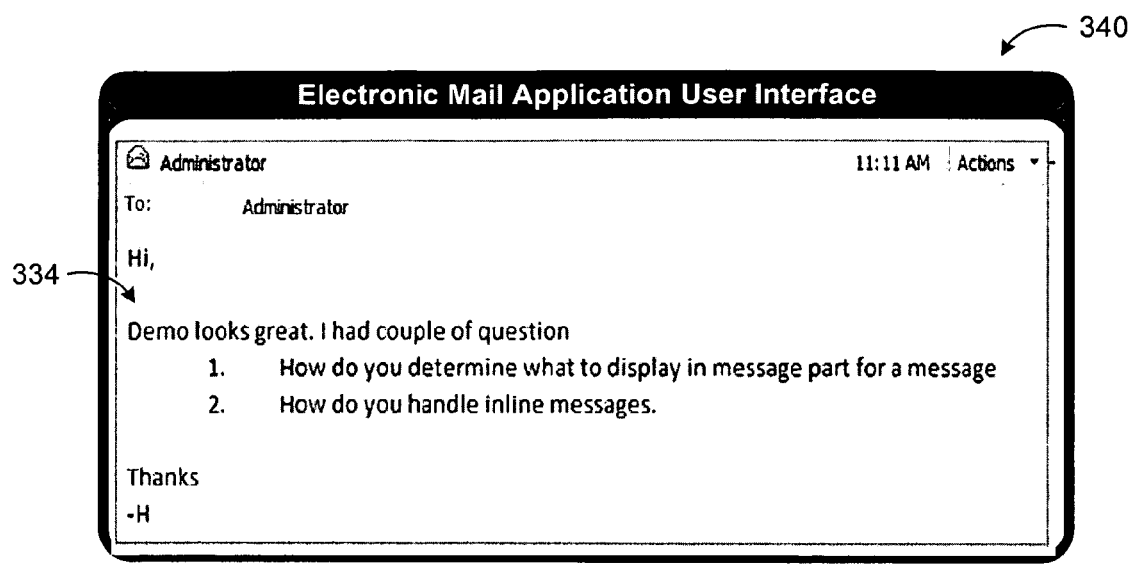
FIG. 3 is another screenshot illustrating the unique parts of the reply message of FIG. 2 compared to the original message of the same figure.

FIG. 3 is another screenshot illustrating the unique parts of the reply message of FIG. 2 compared to the original message of the same figure. After comparing message M2 with M1, the first unique content of message M2, which is "Subject: Demo for message diffing" in header 232 is contained in message part that was just added in the reply. Since the reply header is removed at the end, the unique part that is displayed to the user includes the additions of message M2 as indicated by reference numeral 334.

Figure 4:
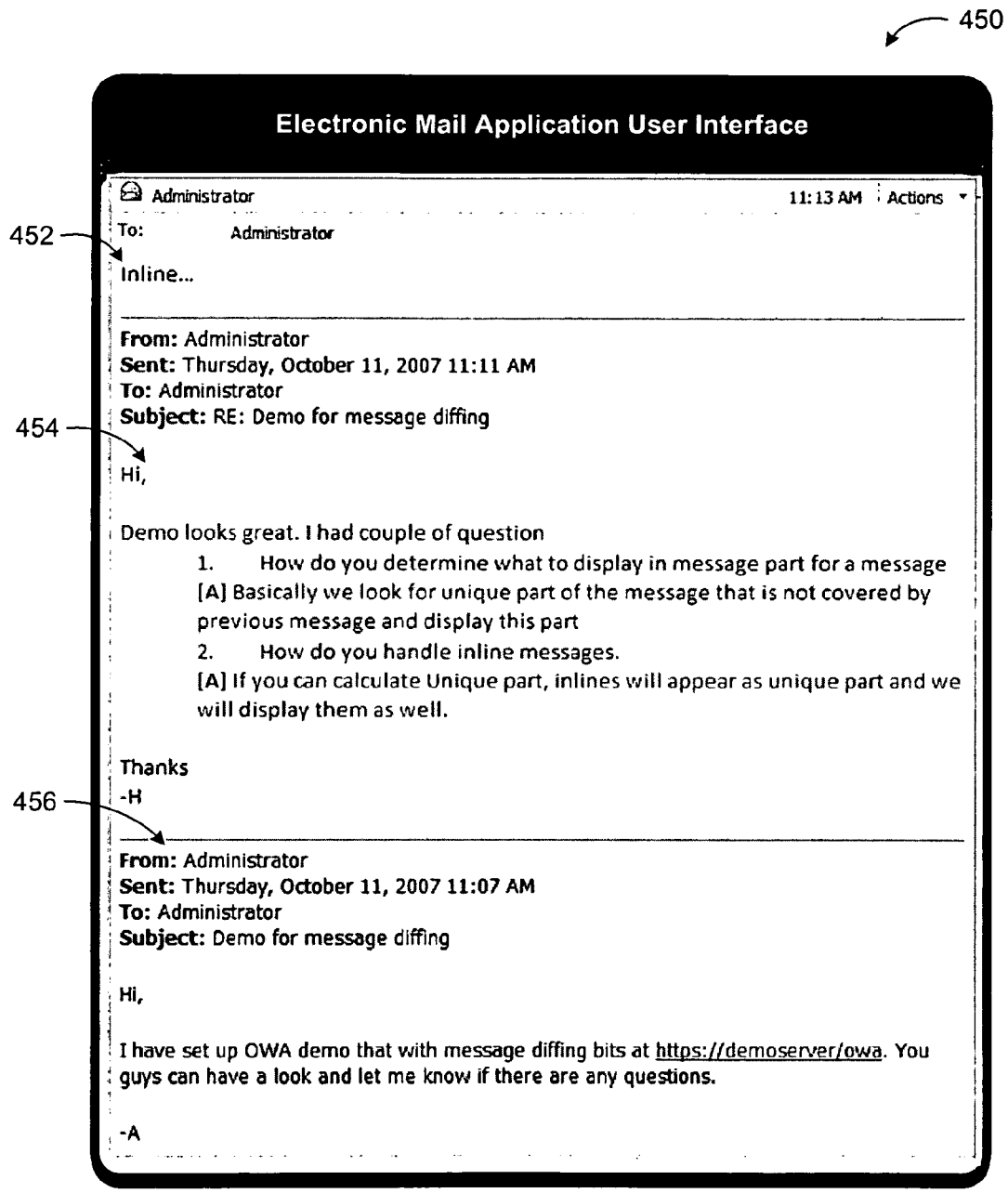
FIG. 4 is yet another screenshot illustrating a response of a user to the message exchange of FIG. 2 by inserting inline comments.

FIG. 4 is yet another screenshot illustrating a response of a user to the message exchange of FIG. 2 by inserting inline comments. In screenshot 450, the first user has responded to message M2 with message M3, which includes a brief indication (452) that actual additions are within the parts (454) of message M2 (inline). The parts (456) of original message M1 as well as the header of message M2 are also displayed. This screenshot illustrates how difficult to follow the exchange can become, if duplicate content is not filtered. Filtering by use of tagging or location of message parts may not work in this example case, because a major portion of the unique content is dispersed within the old content of message M2.

Figure 5:
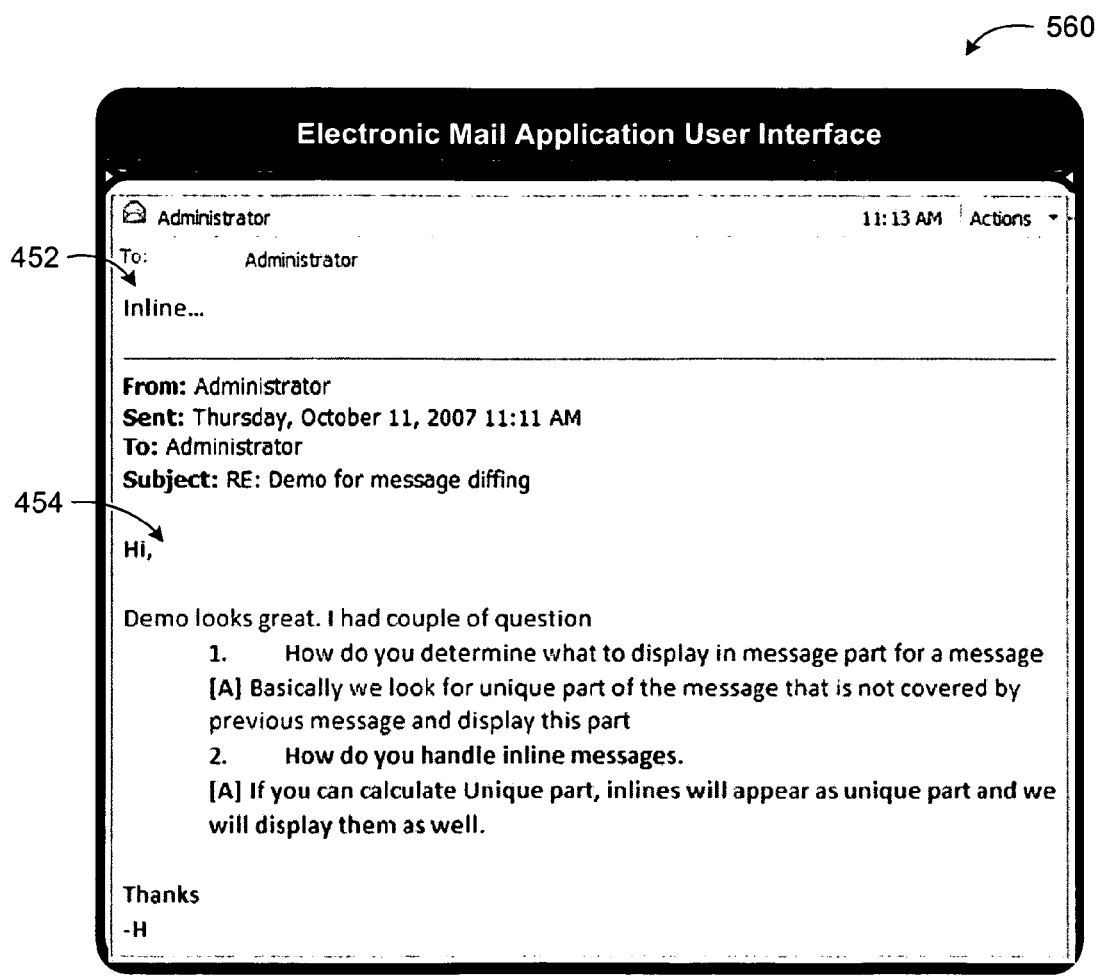
FIG. 5 illustrates a further screenshot illustrating the unique parts of the reply message of FIG. 4 compared to the original message(s)

FIG. 5 illustrates a further screenshot illustrating the unique parts of the reply message of FIG. 4 compared to the original message(s). When comparing message M3 with M2, a system according to embodiments determines that the first unique content of message M3 is "will display them as well" and is contained in a message part of message M2. To generate the unique content such that the reader can make sense of the content, both message parts created in message M3 and message M2 are displayed, and the reply headers at the end of the message removed as duplicate content.

Figure 6:
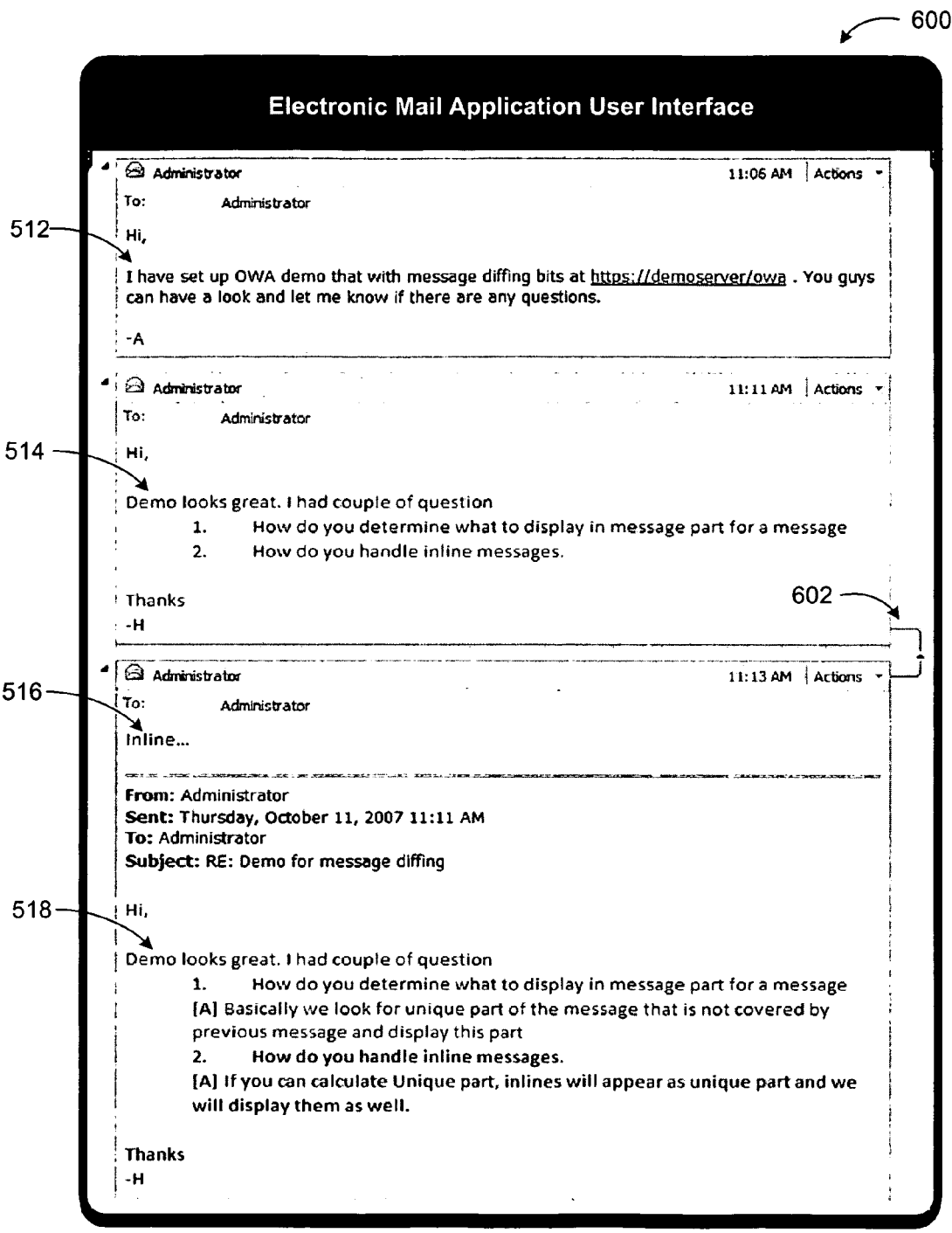
FIG. 6 is a yet further screenshot illustrating the exchanged messages in FIG. 2-5 in a conversation view with the unique parts determined and duplicate parts filtered.

FIG. 6 is a yet further screenshot illustrating the exchanged messages in FIG. 2-5 in a conversation view with the unique parts determined and duplicate parts filtered. In a conversation view, messages may be displayed using a number of tools such as coloring schemes, graphical elements, indentations, and the like, to reflect a relationship (e.g. an in-reply-to relationship) between the messages.

In screenshot 600, original message M1 is displayed at the top with its unique body 512 followed by message M2 with its unique body 514 only (not the repetition of the body of message M1 originally included at the bottom of message M2). Message M3 is displayed with its unique message parts 516 and 518, where the unique parts 516 include the original parts of message M2 because the new content is dispersed within the original content and displaying just the new portion would not make any sense to the reader.

As mentioned above, conversation views may include various schemes to illustrate the relationships between emails without distracting the reader. Thus, in the example screenshot 600, graphical connector element 602 is used to show the connection between messages M3 and M2, when the user has focused on either one of these two messages.

Thus, duplicate content filtering according to embodiments includes three major aspects: (1) extraction of user viewable content from the message body; (2) detection of different message parts in a single message body; and (3) comparison of viewable content from two different messages. The unique part determination may be performed during the detection of different message parts by (a) comparing the bodies using body content and (b) parsing the body content for message parts and determining which message parts are unique.

In the textual message example, the text is extracted keeping the reference back to original position in the body (body may be formatted or plain text). Once user viewable text is obtained, the biggest contiguous block from original message's body is determined in the reply message's body. Then, the last text portion present in reply message's body, not present in the matched contiguous block, and located before the contiguous block in the reply message is determined. Using the position of this text portion in the message body, a determination is made as to which message part this text is part of and that message part of the message body extracted from start to end. If the text portion is part of a message header, the message part of the body from start to the end of the previous message part is extracted.

An algorithm according to embodiments may be optimized by using extra properties of the email message, such as a checksum used for distinct message parts, tags used for identifying different body parts, and the like. As mentioned previously, formatting changes may be ignored since they may not be related to uniqueness of the content. Additionally, email editor based changes such as conversion of ":)" to a smiley face figure may also be ignored. Advertisings and disclaimers may be detected and displayed once, but ignored for the purpose of determining unique content.

In addition to the above illustrated parts, an email user interface employing unique content identification ad duplicate content filtering may include standard components such as selectable controls, links to other functionalities such as calendar. Selectable controls may include textually and/or graphically represented controls for standard operations as well as unique content identification related operations such as filtering parameter definitions, selection for display of advertisings/disclaimers, and the like. An email user interface may also include other sections for related functionalities such as folder list, tasks list, contacts list, and so on.

The described message components, content identification and filtering methods, properties, and scenarios in FIG. 2-6 are exemplary for illustration purposes. An email system employing unique content identification and duplicate content filtering may be implemented using additional or fewer components and features using the principles described herein. Other scenarios and communication types are also possible in a system like the one described here.

Figure 7:
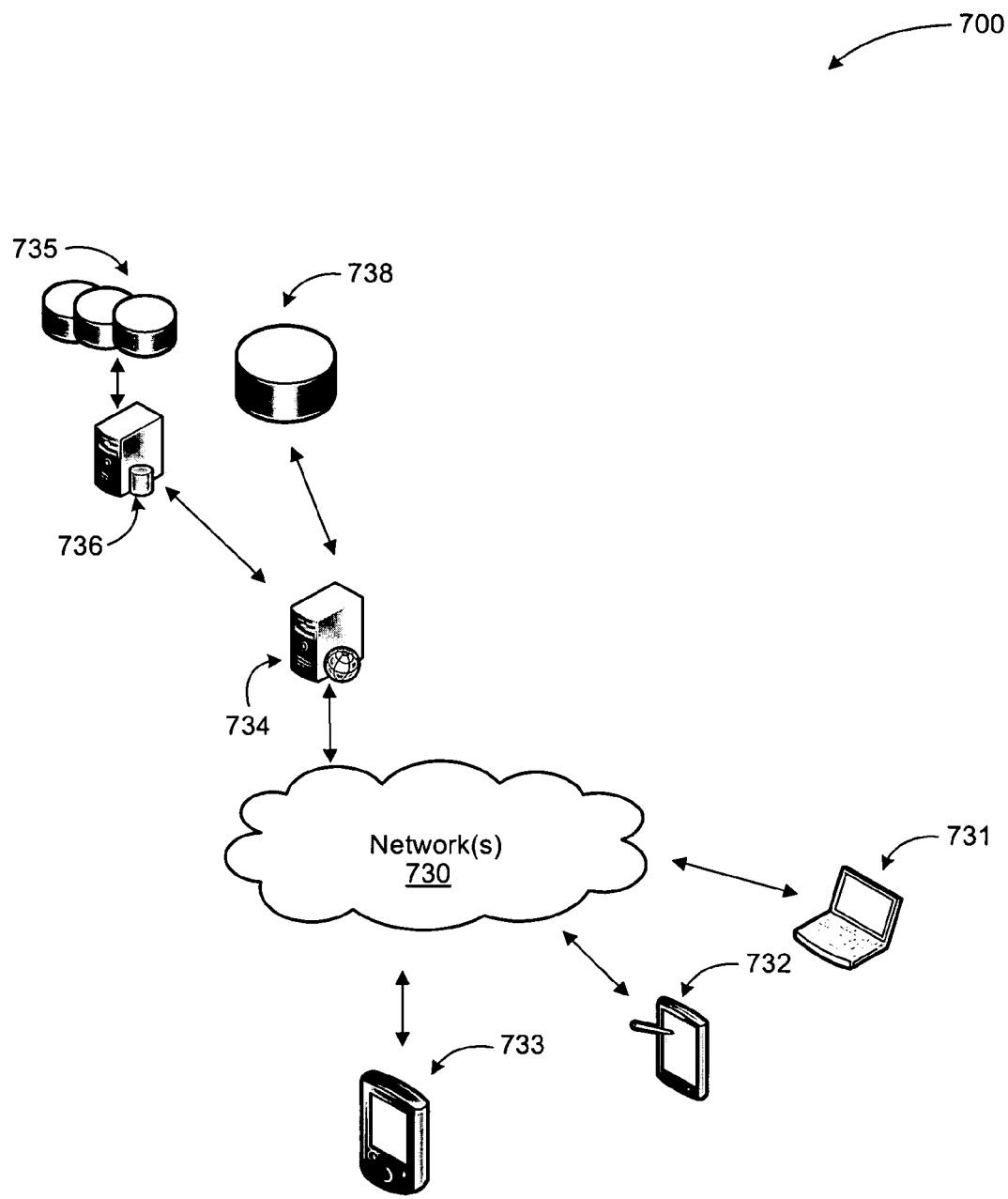
FIG. 7 is an example networked environment, where embodiments may be implemented.

FIG. 7 is an example networked environment, where embodiments may be implemented. Identifying unique content may be implemented in application(s) executed locally on a single computing device or in a distributed manner over a number of physical and virtual clients and servers. The application(s) may also be implemented in un-clustered systems or clustered systems employing a number of nodes communicating over network(s) 730.

Such a system may comprise any topology of servers, clients, Internet service providers, and communication media. Also, the system may have a static or dynamic topology. The term "client" may refer to a client application or a client device. While a networked system executing an email application with unique content identification may involve many more components, relevant ones are discussed in conjunction with this figure.

Email applications identifying unique content and filtering duplicate content may be implemented in individual client devices 731-733 or executed on a server (e.g. server 734) and accessed from anyone of the client devices (or applications). In a hosted email service managed by one or more servers, messages and other data may be stored in system data stores such as data store 738 and accessed directly by the clients or in data stores 735 managed by database server 736.

Network(s) 730 may include a secure network such as an enterprise network or a cellular network, an unsecure network such as a wireless open network, or the Internet. Network(s) 730 provide communication between the nodes described herein. By way of example, and not limitation, network(s) 730 may include wired media such as a wired network or direct-wired connection, and wireless media such as acoustic, RF, infrared and other wireless media.

Many other configurations of computing devices, applications, data sources, data distribution systems may be employed to implement an email system according to embodiments. Furthermore, the networked environments discussed in FIG. 7 are for illustration purposes only. Embodiments are not limited to the example applications, modules, or processes.

Figure 8:
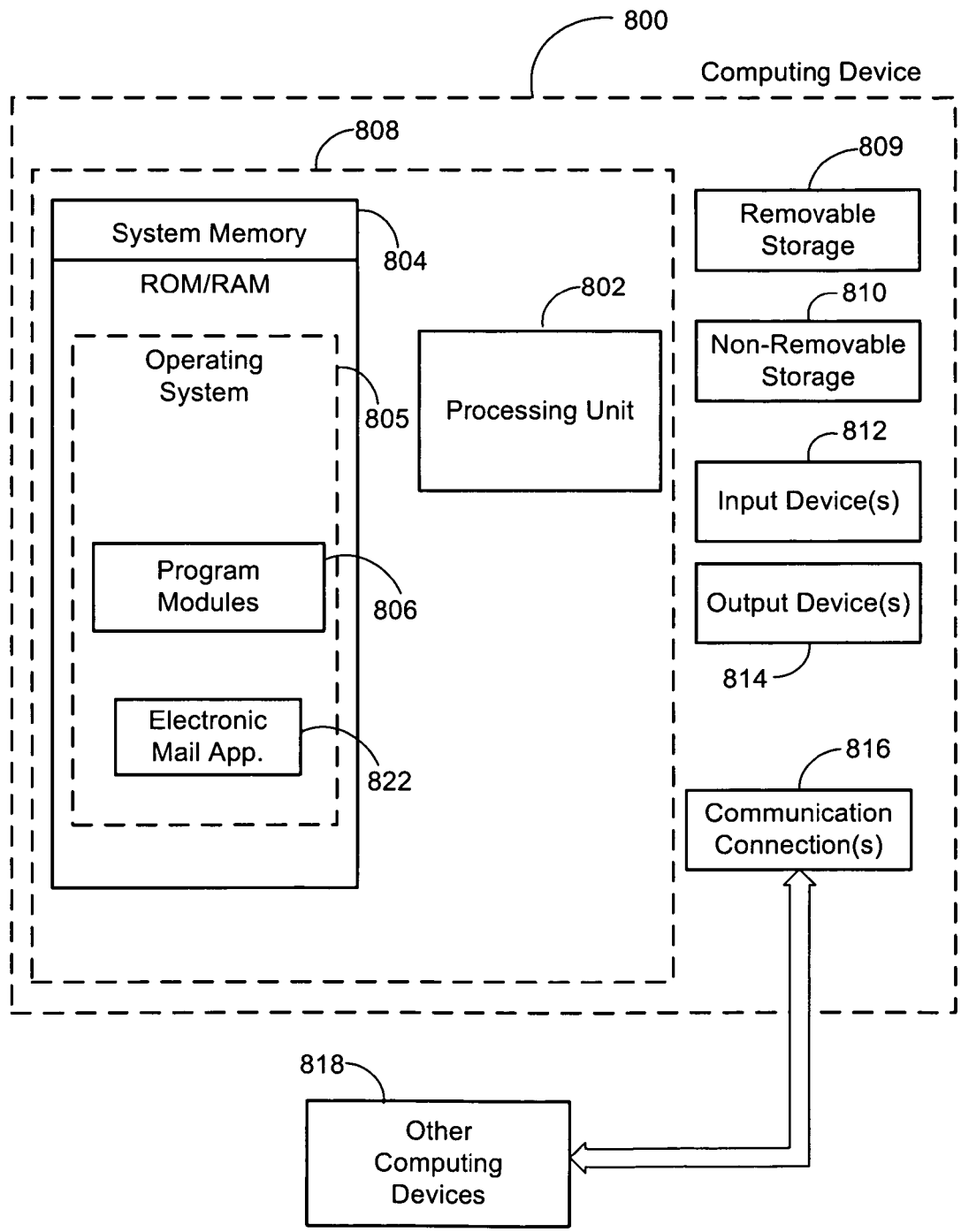
FIG. 8 is a block diagram of an example computing operating environment, where embodiments may be implemented.

FIG. 8 and the associated discussion are intended to provide a brief, general description of a suitable computing environment in which embodiments may be implemented. With reference to FIG. 8, a block diagram of an example computing operating environment is illustrated, such as computing device 800. In a basic configuration, the computing device 800 may be a computer executing an email application and typically include at least one processing unit 802 and system memory 804. Computing device 800 may also include a plurality of processing units that cooperate in executing programs. Depending on the exact configuration and type of computing device, the system memory 804 may be volatile (such as RAM), non-volatile (such as ROM, flash memory, etc.) or some combination of the two. System memory 804 typically includes an operating system 805 suitable for controlling the operation of a networked personal computer, such as the WINDOWS® operating systems from MICROSOFT CORPORATION of Redmond, Wash. The system memory 804 may also include one or more software applications such as program modules 806 and email application 822.

Email application 822 is configured to identify unique content in interrelated messages such as conversations according to various approaches as described previously, and to display the messages by filtering out duplicate content. This basic configuration is illustrated in FIG. 8 by those components within dashed line 808.

The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by removable storage 809 and non-removable storage 810. Computer storage media may include volatile and nonvolatile, removable and non-removable media implemented in any method or technology for storage of information, such as computer readable instructions, data structures, program modules, or other data. System memory 804, removable storage 809 and non-removable storage 810 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of device 800. Computing device 800 may also have input device(s) 812 such as keyboard, mouse, pen, voice input device, touch input device, etc. Output device(s) 814 such as a display, speakers, printer, etc. may also be included. These devices are well known in the art and need not be discussed at length here.

The computing device 800 may also contain communication connections 816 that allow the device to communicate with other computing devices 818, such as over a wireless network in a distributed computing environment, for example, an intranet or the Internet. Other computing devices 818 may include server(s) that execute applications associated with a data access and directory service. Communication connection 816 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 9:
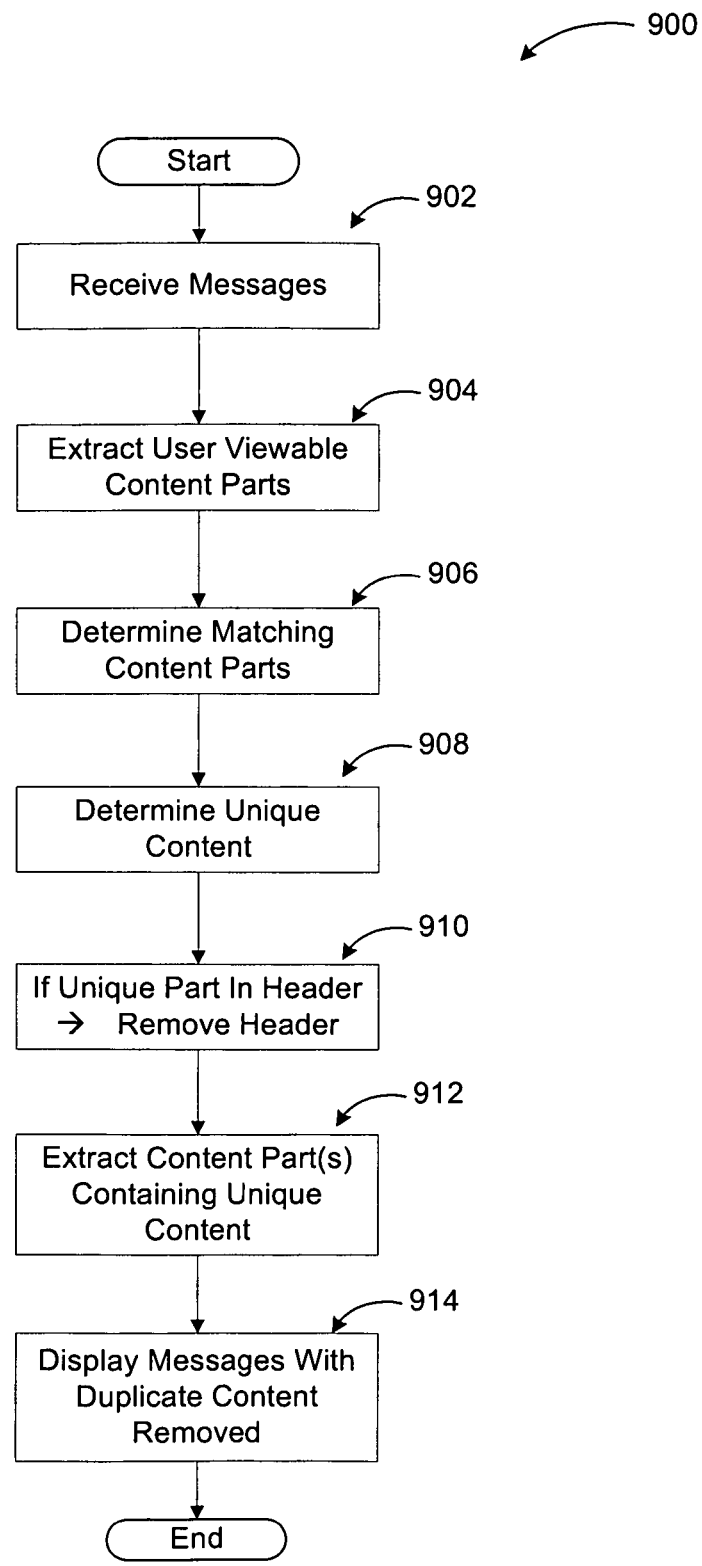
FIG. 9 illustrates a logic flow diagram for a process of identifying unique parts of email messages and filtering duplicate portions in displaying an exchange according to one embodiment.

FIG. 9 illustrates a logic flow diagram for process 900 of identifying unique parts of email messages and filtering duplicate portions in displaying an exchange according to one embodiment. Process 900 may be implemented in a local or distributed email application.

Process 900 begins with operation 902, where at least two interrelated messages are received by the email application for filtering duplicate content. This may be the receipt of a reply message, request by a user for displaying of interrelated messages, move of a message from one folder to another where a related message exists, and the like. Processing advances from operation 902 to operation 904.

At operation 904, user viewable content parts are extracted. An email message may contain a number of parts that are not viewable such as origination or destination codes, properties, and the like. Since unique content identification and filtering of duplicate content is based on viewable portions of the messages, only those parts are of interest to the system. Processing proceeds from operation 904 to operation 906.

At operation 906, matching content parts such as contiguous blocks of text are determined. Matching content parts may include headers and bodies of previous messages (in an in-reply-to relationship). Processing moves from operation 906 to operation 908, where unique content is determined. Unique content is a portion of one of the content parts that is not present in the matching content part of the parent message (or original message). Processing advances from operation 908 to operation 910.

At operation 910, the content part containing the unique content is removed if that content part is a header. Processing moves to operation 912 from operation 910, where using the position of the unique content, the content part which includes the unique content is determined and extracted in whole.

At operation 914 following operation 912, the messages are displayed with duplicate content removed by including only the message parts extracted at operation 912 in the individual messages.

In addition to using parsing of matching message parts, determination of unique content, and extraction of message parts containing the unique content, other tools such as tagging or checksums may also be used for more accurate and/or efficient duplicate content removal. Furthermore, advertisings and disclaimers may be detected employing the above described techniques and displayed only once or removed completely.

The operations included in process 900 are for illustration purposes. Identifying unique content in interrelated messages and filtering duplicate content may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for removing duplicate content in displaying interrelated messages, comprising:

receiving at least two interrelated messages, the at least two interrelated messages comprising an original message and at least one reply message, the at least one reply message comprising the original message, an original message header and reply message content in response to the original message;

determining matching content parts within the interrelated messages;

determining unique content by comparing the matching content parts and detecting a non-matching portion in a content part, wherein determining the unique content further includes detecting a last content part in the original message and the reply message, the last content part including at least one of an advertising blurb and a disclaimer, wherein the last content part is ignored in determining the unique content;

extracting the content part containing the unique content, the unique content including the reply message content and excluding the original message and the original message header; and displaying the interrelated messages by including only extracted content parts with unique content, wherein the interrelated messages are displayed according to a user interface scheme reflecting relationships between the interrelated messages.

2. The method of claim 1, wherein the content parts are determined from user viewable message parts.

3. The method of claim 1, wherein determining the unique content further includes ignoring formatting and style attributes of matching content parts.

4. The method of claim 1, wherein the content parts include at least one from a set of: textual data, graphical data, an image, an audio file, a video file, and a location identifier link.

5. The method of claim 1, wherein determining the unique content further includes detecting and ignoring a message editor based conversion.

6. The method of claim 1, wherein at least one of determining matching content parts and determining unique content also includes utilizing at least one of: a tagging scheme identifying content origin and a checksum scheme associated with each content part.

7. A computing device capable of executing an email application for removing duplicate content in displaying interrelated messages, comprising:
a memory;
a data store; and
a processor coupled to the memory and the data store, wherein the processor is configured to:
receive an original message and a reply message, the reply message comprising the original message, an original message header and reply message content in response to the original message;
determine user viewable body text from both messages;
determine matching message parts within the original message and the reply message;
determine unique text portions by comparing the matching message parts and detecting non-matching text portions, wherein determining the unique text portions further includes detecting a last content part in the original message and the reply message, the last content part including at least one of an advertising blurb and a disclaimer, wherein the last content part is ignored in determining the unique text portions;
extract the unique text portions;
extract a message part containing a unique text portion, if the unique text portion is integrated in the message part with non-unique text portions, the unique text portion including the reply message content, the non-unique text portions including the original message; and
display the original message and the reply message by including the extracted unique text portions and the extracted message part only, wherein the original message and the reply message are displayed according to a user interface scheme reflecting relationships between the original message and the reply message.

8. The computing device of claim 7, wherein a formatting, a font, a style, and a size of the message parts are ignored when determining the unique text portions.

9. The computing device of claim 7, wherein the processor is further configured to:
compare at least one additional message to the original message and the reply message iteratively determining matching message parts and determining unique text portions.

10. The computing device of claim 7, wherein the processor is further configured to:
remove a message part from display if the message part is determined to be a header containing information associated with at least one of a sender, a recipient, and a subject of the message.

11. The computing device of claim 7, wherein the original message and the reply message are part of a conversation.

12. A computer-readable storage device with instructions stored thereon which, when executed by a computing device, will cause the computing device to perform a method for removing duplicate content in displaying interrelated messages, the instructions comprising:
receiving a plurality of interrelated messages;
determining content parts within each of the plurality of interrelated messages, the content parts comprising an original message body part and at least one reply message body part, the at least one reply message body part comprising the original message body part and reply message content in response to the original message;
determining whether each of the content parts includes a header;
removing determined headers in each of the messages other than a top header in each message;
determining matching message body parts within the interrelated messages;
determining if any of the matching message body parts include unique content by comparing the matching content parts and detecting a non-matching portion, wherein determining the unique content includes detecting a last content part in the original message body part and the reply message body part, the last content part including at least one of an advertising blurb and a disclaimer, wherein the last content part is ignored in determining the unique content;
extracting the message body parts containing the unique content, the unique content including the reply message content and excluding the original message body part; and
displaying user selected interrelated messages by including only extracted message body parts with unique content, wherein the user selected interrelated messages are displayed according to a user interface scheme reflecting relationships between the interrelated messages.

13. The computer-readable storage device of claim 12, wherein the instructions further comprise:
if a message body part includes unique content inserted in between duplicate content, extracting the entire message body part for subsequent display.

14. The computer-readable storage device of claim 12, wherein the comparison of matching content parts includes parsing of textual data in the content parts and comparison at one of: word and sentence level.

15. The computer-readable storage device of claim 12, wherein the content parts include at least one from a set of: textual data, an audio recording, a video recording, an image, application data, and a graphic.

16. The method of claim 3, wherein ignoring the formatting and style attributes of the matching content parts comprises ignoring editor based changes, the editor based changes comprising a conversion of text to a graphic.

17. The computing device of claim 8, wherein the style comprises editor based changes in the message parts, the editor based changes comprising a conversion of text to a graphic.

18. The computer-readable storage device of claim 12, wherein determining the unique content further includes ignoring formatting and style attributes of the matching message body parts, wherein ignoring the formatting and style attributes of the matching message body parts comprises ignoring editor based changes, the editor based changes comprising a conversion of text to a graphic.

* * * * *